(12) United States Patent
Kanada

(10) Patent No.: US 6,750,315 B2
(45) Date of Patent: Jun. 15, 2004

(54) POLYETHER AROMATIC KETONE RESIN COMPOSITION AND ITS FILM AND SHEET

(75) Inventor: Arihiro Kanada, Tokyo (JP)

(73) Assignee: Sumitomo Bakelite Company Limited, Tokyo (JP)

( * ) Notice: Subject to any disclaimer, the term of this patent is extended or adjusted under 35 U.S.C. 154(b) by 0 days.

(21) Appl. No.: 10/264,542

(22) Filed: Oct. 4, 2002

(65) Prior Publication Data

US 2003/0105269 A1 Jun. 5, 2003

(30) Foreign Application Priority Data

Oct. 15, 2001 (JP) ........................... 2001-316524

(51) Int. Cl.[7] ............... C08G 2/16; C08G 2/28; C08K 5/07; C08J 3/12
(52) U.S. Cl. ............... 528/220; 528/176; 528/480; 528/485; 524/356; 524/401; 524/404; 524/407
(58) Field of Search .................. 528/220, 176, 528/480, 485; 524/356, 401, 404, 407

(56) References Cited

FOREIGN PATENT DOCUMENTS

| JP | 1-282252 | 11/1989 |
|---|---|---|
| JP | 1-282253 | 11/1989 |
| JP | 6-136255 | 5/1994 |

*Primary Examiner*—Duc Truong
(74) *Attorney, Agent, or Firm*—Smith, Gambrell & Russell, LLP

(57) ABSTRACT

The present invention is envisioned to improve sliding characteristics of polyether aromatic ketone resins and to provide their molded articles which are themselves resistant to damage and abrasion, cause no such damage or abrasion to their partner parts and can be easily molded. Thus, the present invention pertains to a polyether aromatic ketone resin composition comprising a polyether aromatic ketone resin and a high-hardness filler having a Mohs hardness of 6 or higher, the content of said filler being 1 to 100 parts by weight per 100 parts by weight of said ketone resin, and furthermore to a film or sheet made of the resin composition. The high-hardness filler having a Mohs hardness of 6 or higher is preferably particulate or spherical in particle shape. Also, the maximal particle size of said high-hardness filler is preferably not larger than 100 $\mu$m.

15 Claims, No Drawings

POLYETHER AROMATIC KETONE RESIN COMPOSITION AND ITS FILM AND SHEET

TECHNICAL FIELD

The present invention relates to a polyether aromatic ketone-based resin composition having advantageous properties as a resin material for sliding parts such as gears, cams, pulleys, sleeves, bearings, washers, sealing materials, cushion sheets, valve parts, protective covers, etc., used in a variety of machines and apparatus such as electric and electronic apparatus, aircraft instruments, astronautic equipment, automobile instruments, transportation equipment, business machines, and general industrial equipment.

BACKGROUND ART

Polyether aromatic ketone resins have been well known as an engineering plastic having excellent mechanical, chemical and thermal properties as well as high abrasion resistance. It has also been well known that although polyether aromatic ketone resins have a high coefficient of friction in themselves, their sliding characteristics can be remarkably improved to lower the coefficient of friction by incorporating a fluorine resin (JP-A-6-136255). However, although self lubrication is improved, abrasion would rather be increased in use under a high load condition or under a condition of very high frictional contact speed, due to reduction of mechanical strength or loading resistance of the molded product.

It has been known that mechanical strength and sliding characteristics of polyether aromatic ketone resins can be significantly improved to reduce their abrasion by adding glass fiber, aramide fiber, carbon fiber or a solid lubricant such as molybdenum disulfide to said resins (JP-A-1-282252 and JP-A-1-282253). However, in case the sliding partner material is a relatively soft metal such as aluminum alloy or stainless steel, the sliding partner is easily subjected to abrasion by the fibrous reinforcement added and may even suffer abnormal abrasion in some cases.

The main cause of such abnormal abrasion is the abrading action of abraded powders generated as a result of the attack against the soft metal surfaces by the edges of the relatively hard fibrous reinforcing material such as glass fiber or carbon fiber.

Also, use of a fibrous reinforcement tends to induce large anisotropy of shrinkage factor of the resin molding, which causes a reduction of dimensional stability when the ambient temperature is raised in the use environment or by the generation of frictional heat. Therefore, use of a fibrous reinforcement was difficult in applications where high dimensional precision was required. Further, these fibrous reinforcements had the disadvantage of encumbering the working operation, especially in melt extrusion, as the presence of such reinforcements reduces fluidity of the resin.

DISCLOSURE OF THE INVENTION

An object of the present invention is to solve the above problems and provide a resin material for sliding parts having excellent abrasion resistance and a low coefficient of friction and also proof against damage to themselves as well as to their sliding partners even under the use conditions where the sliding partners are made of a soft metal such as an aluminum alloy. It is also intended to provide a resin material for sliding parts which enables use of various molding methods such as injection molding, melt extrusion molding, cast molding, compression molding, sinter molding and powder coating as a means for molding the resin material into a desired shape.

As a result of intensive researches for the solution of the above problems, the present inventor has found that a polyether aromatic ketone resin composition comprising a polyether aromatic ketone resin and 1 to 100 parts by weight per 100 parts by weight of the resin of a high-hardness filler with a Mohs hardness of 6 or higher (this resin composition is hereinafter referred to as "high hardness filler-containing polyether aromatic ketone material") is capable of providing a resin material for sliding parts with excellent abrasion resistance and a low coefficient of friction.

DETAILED DESCRIPTION OF THE INVENTION

The polyether aromatic ketone resins used in the present invention are the thermoplastic resins represented by the following formula (1) or (2). Among those having the structure of formula (1) there is mentioned, for example, a commercial product PEEK (trade name) available from Victrex Inc.

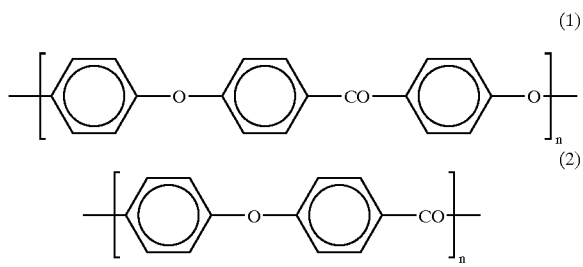

In the above formulae (1) and (2), n means 2 to 100000.

These resins may have the following recurring units in addition to those of the formulae (1) and (2):

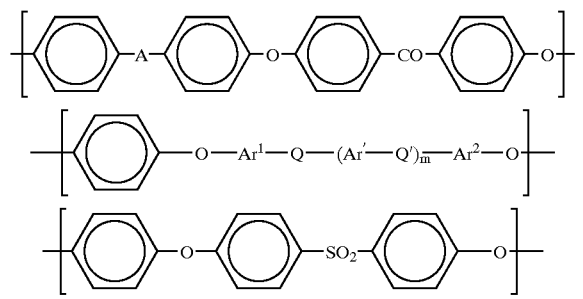

wherein $Ar^1$ and $Ar^2$ represent independently

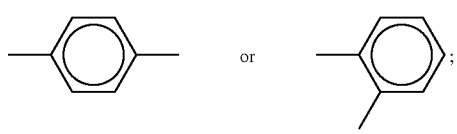

A represents a direct bond, O, S, $SO_2$, CO or a divalent hydrocarbon group; Q and Q' represent independently $SO_2$ or CO; $Ar'$ represents a divalent aromatic group; and m is a number of 0, 1, 2 or 3.

In accordance with the present invention, it is possible to obtain a resin composition for sliding parts having high heat resistance, abrasion resistance and chemical resistance as well as excellent moldability with high productivity and at low cost by incorporating in a polyether aromatic ketone resin a high-hardness filler having a Mohs hardness of 6 or higher, the amount of said filler incorporated being 1 to 100 parts by weight per 100 parts by weight of said ketone resin.

In the present invention, the filler is contained in an amount of 1 to 100 parts by weight, preferably 3 to 50 parts by weight, per 100 parts by weight of the polyether aromatic ketone resin used as a base material.

When the content of the high-hardness filler having a Mohs hardness of 6 or higher is less than 1 part by weight per 100 parts by weight of the polyether aromatic ketone resin in the present invention, the effect of improving abrasion resistance of the resulting resin composition is unsatisfactorily small. When the filler content exceeds 100 parts by weight, molding workability of the resin composition deteriorates.

The polyether aromatic ketone resins excel in heat resistance, abrasion resistance, chemical resistance and mechanical strength and also have favorable melting properties that enable injection molding or melt extrusion molding of these resins.

According to the present invention, a resin composition for sliding parts with excellent heat resistance, abrasion resistance, chemical resistance and moldability can be obtained at low cost by incorporating in a polyether aromatic ketone resin a high-hardness filler having a maximal particle size of not larger than 100 μm in an amount of 1 to 100 parts by weight per 100 parts by weight of said ketone resin.

In the present invention, in order to produce an outstanding effect, a high-hardness filler having an average particle size of 0.1 to 10 μm, preferably 1 to 8 μm, more preferably 2 to 5 μm, is used.

When the average particle size of the filler used in the present invention is less than 0.1 μm, the effect of the filler to improve abrasion resistance of the polyether aromatic ketone resin is small, and furthermore fluidity of the composition tends to reduce during its melt working, making it hard to perform desired working.

When the average particle size of the filler is larger than 10 μm, the molded products of the resin composition tend to prove defective in appearance and it is hard to obtain desired smoothness of the surface. Poor surface smoothness enlarges the coefficient of friction and also makes it unstable. Further, fluidity of the composition tends to deteriorate during its melt working, making it difficult to perform desired working.

When the maximal particle size of the filler is larger than 100 μm, there arise the similar problems of defective appearance and poor surface smoothness of the molded products.

The spherical or particulate high-hardness filler used in the present invention can attain drastic improvement of sliding characteristics of the resin composition of the present invention. Since this high-hardness filler has the effect of receiving load at the sliding surface as well as the effect of inhibiting softening of the resin by the frictional heat, it contributes to the improvement of abrasion resistance of the composition.

If the spherical or particulate high-hardness filler used in the present invention is close to sphere in its particle shape, it has good dispersibility in the base resin and can be uniformly dispersed in the polyether aromatic ketone resin, making it possible to afford high abrasion resistance uniformly to the entire resin composition.

Furthermore, in case the spherical or particulate high-hardness filler is close to sphere in its particle shape, the resin to which the filler has been added is not much deteriorated in fluidity and shows good workability, making it possible to obtain the molded products with a smooth surface in all types of molding work. The high-hardness filler used in the present invention is of an average sphericity of 0.6 to 1.0, preferably 0.8 to 1.0, and more preferably 0.9 to 1.0. In this connection, the sphericity of a particle is defined as the ratio of orthogonal diameters of the particle.

The spherical or particulate high-hardness filler used in the present invention is not subjected to specific restrictions; it is possible to use various types of fillers such as silica particles, alumina particles and silicon nitride. Silica particles, for instance, can be obtained by pulverizing natural silica constituting natural quartz rock or synthetic silica and preferably subjecting it to a high temperature (several thousand degree) heat treatment, such as fusion or thermal spraying, to make the particle shape spherical.

In the resin composition of the present invention, preferably a polyether aromatic ketone resin and a spherical or particulate high-hardness filler are mixed up uniformly.

The present composition may contain where necessary fiber reinforcements such as glass fiber, carbon fiber, potassium titanate fiber, ceramic fiber, aramide fiber, boron fiber, etc.; particulate or scaly reinforcements such as calcium carbonate, clay, talc, mica, graphite carbon, molybdenum disulfide, etc.; electroconductivity improver such as carbon, zinc oxide, titanium oxide, etc.; heat conductivity improver such as powdered metal oxides, etc.; antioxidant; thermal stabilizer; antistatic agent; ultraviolet absorber; lubricant; release agent; dye; pigment; other thermoplastic resins such as polyamide, polycarbonate, polyacetal, PET, PBT, polyarylate, polyphenylene sulfide, polyethersulfone, polysulfone, polyetherimide, polyimde, fluororesin, polyethernitril, liquid crystal polymer, etc.; and thermosetting resins such as phenolic resin, epoxy resin, polyimide, silicone, polyamide-imide, etc. as long as these additives won't affect the effect of the present invention. The fillers may be subjected to a surface treatment such as silane coupling.

Various methods are available for mixing or kneading the high-hardness filler-containing polyether aromatic ketone material of the present invention. For instance, the material components may be supplied separately to a melt extruder and mixed, or the feed-stock powder alone may be subjected to dry premixing by using a suitable mixer such as Henschel mixer, ball mill, blender or tumbler, and then the two components may be melt-kneaded by a melt-kneader. For molding the composition, it is possible to employ various molding methods, such as injection molding, melt extrusion molding, cast molding, compression molding, sinter molding, powder coating, etc., which are suited for the base resin.

In a preferred mode of practice of the present invention, the high-hardness filler-containing polyether aromatic ketone material is molded into a film or sheet by melt extrusion molding, but the extrusion method and the take-up method are not specifically restricted.

For making a sheet from said material of the present invention, it is preferable to use a method in which the extrudate from melt extrusion is immediately taken up and cooled and solidified by a cooling roller. By smoothing the cooling roller surface, it is possible to transfer smoothness of the roller surface to the sheet surface when the molten resin, for instance, PEEK is solidified. If the thus obtained PEEK sheet with high surface smoothness is die-cut into a thrust bearing material and used as such, it is capable of inhibiting abrasion. The cooling roller surface may be matte-finished to obtain a sheet surface having a desired degree of surface roughness.

In the cooling and solidifying step, beside the method using the cooling roller, there can be also employed a method using a belt conveyor type take-up belt. By smoothing the surface of the take-up belt, it is possible to transfer smoothness of the belt surface to the sheet surface when the molten PEEK is solidified.

In case of using a cooling roller, either one side alone of the sheet is cooled or both sides of the sheet are cooled and solidified simultaneously by using two or more rollers.

In case of using a belt conveyor type take-up belt, the sheet is taken-up with either one side alone contacted with the belt or with both sides sandwiched between two or more belts where the both sides are cooled, solidified and conveyed.

For the high-hardness filler-containing polyether aromatic ketone material used as a thrust bearing material placed in contact with a revolving shaft, it is required for abrasion resistance that its surface is as smooth as it can be. As for surface smoothness of a sheet of the high-hardness filler-containing polyether aromatic ketone material, it is preferable that its center line average roughness (Ra) is not larger than 2 μm, more preferably not larger than 1 μm. In case of using the material as a thrust bearing material, it is preferably worked to an optimal surface roughness in relation to its sliding partner material.

For obtaining a sheet with excellent surface smoothness from the high-hardness filler-containing polyether aromatic ketone material, it is required that the sheet is free of contamination. It is possible to remove contaminants by filtering the molten high-hardness filler-containing polyether aromatic ketone material when it is melt extruded into a sheet. The type of the filter used and the filtering conditions are not specifically limited in the present invention.

Shape of the high-hardness filler-containing polyether aromatic ketone material is not restricted, but it is preferably a die-cut disc-like flat plate or a plate with curved faces formed during die-cutting.

Thickness of the high-hardness filler-containing polyether aromatic ketone material is preferably in the range of 25 to 1,000 μm. When it is less than 25 μm, workability of die-cutting and other operations and stability at the time of assembling are bad, and when the thickness exceeds 1,000 μm, the material becomes hard to die-cut or costly.

BEST MODE FOR CARRYING OUT THE INVENTION

The present invention is described in further detail with reference to the examples and comparative examples, but the scope of the invention is not limited by these examples in any way.

EXAMPLES 1 TO 4 AND COMPARATIVE EXAMPLES 1 TO 10

The materials used in the Examples and the Comparative Examples are as listed below.

*1: Polyether aromatic ketone resin
  PEEK 450P (trade name) produced by Victrex Inc.
  Melt viscosity measured at a temperature of 400° C. and a shear rate of 1000 sec$^{-1}$: 4500 poises
*2: Carbon fiber (fibrous)
  HTA-C6-UEL1 (trade name) produced by Toho Rayon Co., Ltd. Average size: 6 μm×3 mm
*3: Aluminum borate whisker (fibrous)
  Aluborex Y (trade name) produced by Shikoku Kasei KK
  Average size: 0.8 μm×20 μm
*4: Aramide fiber (fibrous)
  Twaron 5011 (trade name) produced by Nippon Aramide Co., Ltd. Average size: 55 μm

*5: Molybdenum disulfide (scaly)
  Molypowder B (trade name) produced by Nippon Graphite Industries Co., Ltd.
  Average size: 3 μm
*6: Alumina particles (particulate)
  AO-502 (trade name) produced by Admatechs Co., Ltd.
  Average size: 0.5 μm, Mohs hardness: 8.5,
  Average sphericity: 0.83
*7: Silica particles (particulate)
  PLV-3 (trade name) produced by Tatsumori Co., Ltd.
  Average size: 3 μm, Mohs hardness: 6.7,
  Average sphericity: 0.86

The materials shown in Tables 1 to 3 were melted and kneaded by a double-screw kneader/extruder to produce pellets. In each table, the numerical values in the columns of "Composition" of each Example and Comparative Example mean parts by weight. The produced pellets were melt extruded or hot pressed using a single-screw extruder and a T-die to obtain sheet-like samples.

Property evaluations of the samples were made according to the following testing methods.
(1) Abrasion Resistance (1)
  Using a wear ring abrading type abrasion tester, the abrasion test was conducted by rotating the test piece at a speed of 60 rpm under a sliding load of 1,000 gf for an abrasion distance of 245 meters and then the volume of abrasion of the test piece was measured according to JIS K 7204.
(2) Surface Hardness
  Pencil scratch hardness was measured according to JIS K 5400.
(3) Abrasion Resistance (2)
  Using a pin-on-disc type abrasion tester, the abrasion test was conducted by rotating an SUS shaft at a speed of 10,000 rpm under a sliding load of 90 gf for a period of 100 hours and the traces of abrasion of the test piece and the condition of abrasion at the shaft end were observed. Result was rated as follows. ○: Abrasion of both the test piece and the shaft end was scarce; Δ: Abrasion of either the test piece or the shaft end could be confirmed: X: Abrasion of both the test piece and the shaft end could be confirmed.
(4) Impact Resistance
  Izod impact strength was determined according to JIS K 7110.
(5) Moldability
  Each composition was molded into a strand and a sheet using a double-screw kneader and a single-screw kneader, and the appearance of the molded products was visually evaluated. ○: The molded products had good appearance; X: Surface roughness was large or the stabilized molded products could not be obtained.

Results are shown in Tables 1 to 3.

Comparing Examples 1–4 of the present invention with Comparative Example 1, it is noted that in Examples 1–4, as compared with Comparative Example 1 where a polyether aromatic ketone resin alone is used, abrasion resistance is improved with no deterioration in moldability and without causing abrasion of the sliding partner by virtue of the addition of high-hardness particles.

It can be seen from the results of Comparative Examples 9 and 10 shown in Table 3 that the desired effect of improving the sliding characteristics can not be obtained when the content of the high-hardness particles is low, while moldability is very bad making it hard to perform working when the particle content is too high.

It can be learned from Comparative Examples 2 and 3 in Table 2 that use of carbon fiber cannot provide an excellent slide part as it causes abrasion of the sliding partner although its effect of decreasing the amount of abrasion can be confirmed.

The results of Comparative Examples 4, 5 and 8 shown in Tables 2 and 3 indicate that in case of using aluminum borate whisker or molybdenum disulfide, there cannot be obtained an excellent slide part as the obtained product tends to cause abrasion of its sliding partner and/or is itself susceptible to abrasion.

When aramide fiber is used as in Comparative Examples 6 and 7 shown in Table 3, it is noted that although an improvement of abrasion resistance is ensured, it is impossible to obtain an excellent slide part since moldability and appearance of the molded product are bad.

TABLE 1

|  |  | Example 1 | Example 2 | Example 3 | Example 4 |
|---|---|---|---|---|---|
| Composition (Parts by weight) | Polyether aromatic ketone resin (*1) | 100 | 100 | 100 | 100 |
|  | Carbon fiber (*2) |  |  |  |  |
|  | Aluminum borate whisker (*3) |  |  |  |  |
|  | Aramide fiber (*4) |  |  |  |  |
|  | Molybdenum disulfide (*5) |  |  |  |  |
|  | Alumina particles (*6) |  | 5 |  | 100 |
|  | Silica particles (*7) | 10 |  | 80 |  |
| Properties | Abrasion resistance (1) | 7.0 | 7.1 | 7.2 | 8.1 |
|  | Surface hardness | 4H | 3H | 6H | 6H |
|  | Abrasion resistance (2) | ○ | ○ | ○ | ○ |
|  | Impact resistance | 25.6 | 28.7 | 22.3 | 17.3 |
|  | Moldability | ○ | ○ | ○ | ○ |

Abrasion resistance (1): unit of numerical values in the table = x $10^3$ cm$^3$
Impact resistance: unit of numerical values in the table = kJ/m$^2$, thickness of a sample = 5 mm

TABLE 2

|  |  | Comp. Example 1 | Comp. Example 2 | Comp. Example 3 | Comp. Example 4 | Comp. Example 5 |
|---|---|---|---|---|---|---|
| Composition (Parts by weight) | Polyether aromatic ketone resin (*1) | 100 | 100 | 100 | 100 | 100 |
|  | Carbon fiber (*2) |  | 10 | 20 |  |  |
|  | Aluminum borate whisker (*3) |  |  |  | 10 | 30 |
|  | Aramide fiber (*4) |  |  |  |  |  |
|  | Molybdenum disulfide (*5) |  |  |  |  |  |
|  | Alumina particles (*6) |  |  |  |  |  |
|  | Silica particles (*7) |  |  |  |  |  |
| Properties | Abrasion resistance (1) | 9.0 | 7.7 | 6.8 | 11.2 | 14.7 |
|  | Surface hardness | H | 4H | 5H | 4H | 6H |
|  | Abrasion resistance (2) | Δ | X | X | X | X |
|  | Impact resistance | 21.6 | 38.1 | 41.0 | 18.4 | 11.5 |
|  | Moldability | ○ | ○ | ○ | ○ | ○ |

Abrasion resistance (1): unit of numerical values in the table = x $10^3$ cm$^3$
Impact resistance: unit of numerical values in the table = kJ/m$^2$, thickness of a sample = 5 mm

TABLE 3

|  |  | Comp. Example 6 | Comp. Example 7 | Comp. Example 8 | Comp. Example 9 | Comp. Example 10 |
|---|---|---|---|---|---|---|
| Composition (Parts by weight) | Polyether aromatic ketone resin (*1) | 100 | 100 | 100 | 100 | 100 |
|  | Carbon fiber (*2) |  |  |  |  |  |
|  | Aluminum borate whisker (*3) |  |  |  |  |  |
|  | Aramide fiber (*4) | 10 | 20 |  |  |  |
|  | Molybdenum disulfide (*5) |  |  | 20 |  |  |
|  | Alumina particles (*6) |  |  |  | 0.5 |  |
|  | Silica particles (*7) |  |  |  |  | 300 |
| Properties | Abrasion resistance (1) | 8.7 | 7.9 | 13.7 | 9.0 | 16.8 |
|  | Surface hardness | 3H | 4H | H | H | — |
|  | Abrasion resistance (2) | ○ | ○ | ○ | Δ | X |
|  | Impact resistance | 27.9 | 32.7 | 26.5 | 20.9 | — |
|  | Moldability | Δ | X | ○ | ○ | X |

Abrasion resistance (1): unit of numerical values in the table = x $10^3$ cm$^3$
Impact resistance: unit of numerical values in the table = kJ/m$^2$, thickness of a sample = 5 mm As explained above in detail, the resin composition according to the present invention has excellent abrasion resistance and moldability and is capable of producing the resin molded articles which are themselves resistant to damage and abrasion and also have little probability of causing damage and abrasion to their partner parts.

What is claimed is:

1. A polyether aromatic ketone resin composition comprising a polyether aromatic ketone resin and a high-hardness spherical filler having a Mohs hardness of 6 or higher, the content of said filler in the composition being 1 to 100 parts by weight per 100 parts by weight of said resin.

2. A polyether aromatic ketone resin composition according to claim 1 wherein the polyether aromatic ketone resin is represented by the formula (1) or (2):

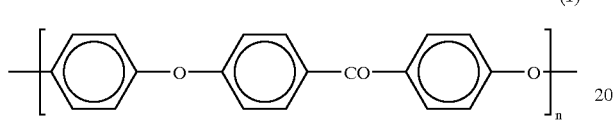
(1)

wherein n means 2 to 100000, or

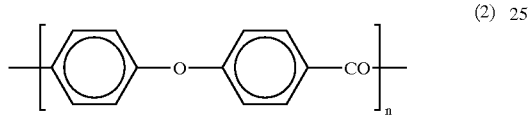
(2)

wherein n means 2 to 100000.

3. A polyether aromatic ketone resin composition according to claim 1 wherein the high-hardness spherical filler having a Mohs hardness of 6 or higher is particulate or spherical in particle shape and has an average sphericity of 0.6–1.0.

4. A polyether aromatic ketone resin composition according to claim 1 wherein the maximal particle size of the high-hardness spherical filler having a Mohs hardness of 6 or higher is not larger than 100 μm.

5. A polyether aromatic ketone resin composition according to claim 1 wherein the average particle size of the high-hardness spherical filler having a Mohs hardness of 6 or higher is 0.1 to 10 μm.

6. A film made of the polyether aromatic ketone resin composition set forth in claim 1.

7. A film made of the polyether aromatic ketone resin composition set forth in claim 3.

8. A film made of the polyether aromatic ketone resin composition set forth in claim 4.

9. A film made of the polyether aromatic ketone resin composition set forth in claim 5.

10. A sheet made of the polyether aromatic ketone resin composition set forth in claim 1.

11. A sheet made of the polyether aromatic ketone resin composition set forth in claim 3.

12. A sheet made of the polyether aromatic ketone resin composition set forth in claim 4.

13. A sheet made of the polyether aromatic ketone resin composition set forth in claim 5.

14. The polyether aromatic ketone resin composition according to claim 1, wherein the content of filler is 3 to 50 parts by weight per 100 parts by weight of said resin.

15. The polyether aromatic ketone resin composition according to claim 1 which additionally contains a resin having the recurring unit selected from the group consisting of:

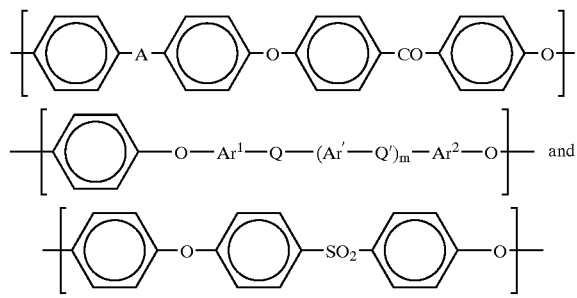

wherein $Ar^1$ and $Ar^2$ represent independently

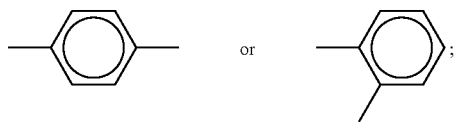

A represents a direct bond, O, S, $SO_2$, CO or a divalent hydrocarbon group; Q and Q' represent independently $SO_2$ or CO; Ar' represents a divalent aromatic group; and m is a number of 0, 1, 2 or 3.

* * * * *